(No Model.)
A. KASTOR.
COMBINED CORKSCREW AND POCKET KNIFE.
No. 577,259. Patented Feb. 16, 1897.
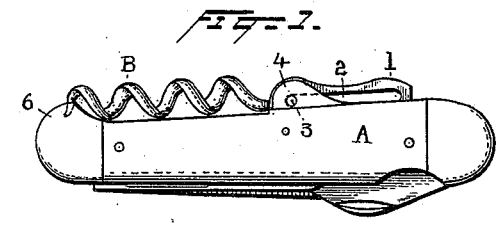
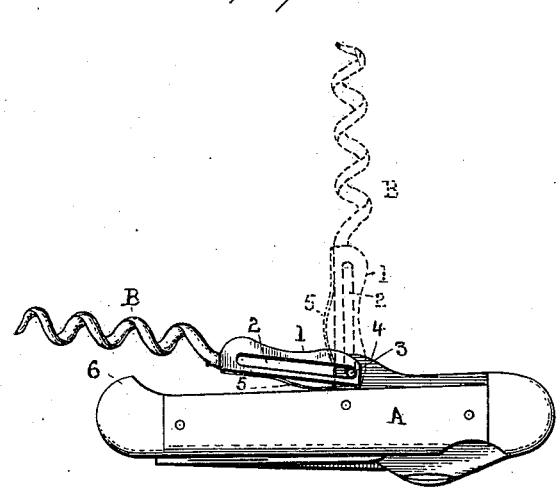

UNITED STATES PATENT OFFICE.

ADOLPH KASTOR, OF NEW YORK, N. Y.

COMBINED CORKSCREW AND POCKET-KNIFE.

SPECIFICATION forming part of Letters Patent No. 577,259, dated February 16, 1897.

Application filed September 14, 1896. Serial No. 605,693. (No model.)

*To all whom it may concern:*

Be it known that I, ADOLPH KASTOR, a citizen of the United States, and a resident of New York city, in the county and State of New York, have invented a certain new and useful Improvement in a Combined Corkscrew and Pocket-Knife, of which the following is a specification.

Corkscrews as generally provided in pocket-knives are comparatively small and short and for this reason fail to secure sufficient hold upon a tightly-fitting cork when extracting and are therefore undesirable and not more generally used.

In order to provide a corkscrew convenient and easy of operation, it is essential that the handle project to about equal distances in opposite directions from the sides of the implement, and a corkscrew applied in this manner to a pocket-knife is pivoted to the handle at a point midway of its ends. Hence the length of the corkscrew is only about half the length of the knife-handle, and if the extractor is pivoted to the handle at or near one end difficulty is encountered in applying the device to a cork and a firm grip cannot be advantageously obtained when exerting force to remove a cork.

This invention makes it possible to provide a pocket-knife with a corkscrew of a length equal or nearly equal to the length of the handle and have positive connection with said handle at a middle point in its length, thereby attaining all the advantages of the ordinary corkscrew.

The improvement consists of a pocket-knife and a corkscrew approximating the length of the knife-handle and having a sliding pivotal connection therewith at a point midway of the ends of the said handle.

The invention further consists of a guard at one end of the handle to protect the point of the corkscrew when the latter is closed, and a spring attached to and movable with the corkscrew to throw the latter outward from behind the guard when sliding forward prior to opening.

The invention also further consists of the novel details of construction and combination of the parts, which hereinafter will be more particularly described, claimed, and illustrated in the accompanying drawings, in which—

Figure 1 is a side elevation of a pocket-knife having the invention applied and showing the corkscrew folded. Fig. 2 is a view similar to Fig. 1, the handle being partly broken away, showing the corkscrew moved forward by full lines and opened by dotted lines.

Corresponding and like parts are indicated in the views of the drawings and referred to in the following description by the same reference-characters.

The pocket-knife may be of any size, make, or style, and is illustrated to show the application of the invention, and is designated by the letter A. Ears or wings 4 are formed with or provided upon the handle about midway of its ends and support a pin 3. The corkscrew B has a shank 1, formed with a longitudinal slot 2, through which passes the pin 3, by means of which positive connection is had between the corkscrew and knife-handle. This corkscrew or extractor approximates the length of the knife-handle and is adapted to slide and turn upon the pin 3 and when closed lies close against the knife-handle, as indicated in Fig. 1. The shank 1 fits snugly between the ears 4, and its rear end is cut straight across to bear against the knife-handle, to steady the latter when advancing the extractor into a cork to be removed.

A guard 6 is provided at one end of the knife-handle for the point of the corkscrew to fit behind when closed, thereby masking said point and preventing it catching into the clothing or hand. A spring 5 is secured to the inner or rear edge of the shank 1 and is adapted to be compressed between said shank and knife-handle when the corkscrew is closed and exerts an outward pressure upon the inner or rear end of the corkscrew, thereby holding the point concealed behind the guard 6. When moving the corkscrew forward, the spring 5 will throw the point of the extractor away from the handle, as shown by the full lines in Fig. 2, thereby admitting of the corkscrew being readily grasped, so as to be turned into the position shown by dotted lines in said Fig. 2, when it is ready for use.

The pin 3 and slot 2 provide a sliding pivotal connection between the corkscrew and knife-handle and are the means which render it feasible to employ an extractor of a length about equal to the knife-handle and yet occupy a medial position when adjusted for service.

In adapting the invention to the different makes of knives it is to be understood that various changes in the form, proportion, and minor details of construction may be resorted to without departing from the spirit of the invention.

Having thus described the invention, what is claimed as new, and desired to be secured by Letters Patent, is—

The combination with a pocket-knife, and a pin connected with the handle thereof about midway of its ends, of a corkscrew having a sliding and pivotal connection with the knife by means of the said pin, and a spring attached to the inner or rear edge of the corkscrew and adapted to hold the corkscrew closed and to throw it outward when moved forward, substantially in the manner set forth.

This specification signed and witnessed this 10th day of September, 1896.

ADOLPH KASTOR.

Witnesses:
 GEORGE M. WILFORD,
 JOHN F. WALKER.